(12) United States Patent
Nahill et al.

(10) Patent No.: US 7,033,656 B2
(45) Date of Patent: Apr. 25, 2006

(54) GRADED CRYSTALLIZATION OF CONTAINER FINISHES

(75) Inventors: Thomas E. Nahill, Amherst, NH (US);
Keith J. Barker, Candia, NH (US);
Brian A. Lynch, Merrimack, NH (US)

(73) Assignee: Graham Packaging PET Technologies, Inc., York, PA (US)

( * ) Notice: Subject to any disclaimer, the term of this patent is extended or adjusted under 35 U.S.C. 154(b) by 0 days.

(21) Appl. No.: 10/122,901

(22) Filed: Apr. 12, 2002

(65) Prior Publication Data

US 2003/0194518 A1 Oct. 16, 2003

(51) Int. Cl.
*B32B 1/02* (2006.01)

(52) U.S. Cl. .................... 428/35.7; 428/542.8
(58) Field of Classification Search ........... 428/35.7, 428/542.8
See application file for complete search history.

(56) References Cited

U.S. PATENT DOCUMENTS

| | | | |
|---|---|---|---|
| 3,562,372 A | 2/1971 | Schjeldahl | 264/94 |
| 3,880,973 A | 4/1975 | Yoshikawa | 264/94 |
| 3,894,835 A | 7/1975 | Berggren et al. | |
| 4,036,927 A | 7/1977 | Stolki | |
| 4,050,887 A | 9/1977 | Berggren et al. | |
| 4,117,050 A | 9/1978 | Appel et al. | |
| 4,164,298 A | 8/1979 | Nishikawa et al. | |
| 4,179,488 A | 12/1979 | Nishikawa | 264/521 |
| 4,233,022 A | 11/1980 | Brady | 425/525 |
| 4,260,567 A | 4/1981 | Poppe et al. | |
| 4,264,558 A | 4/1981 | Jacobsen | |
| 4,297,306 A | 10/1981 | Yoshino et al. | |
| 4,315,725 A | 2/1982 | Yoshino | |
| 4,382,760 A | 5/1983 | Wiatt et al. | |
| 4,386,046 A | 5/1983 | Yoshino et al. | |
| 4,407,651 A | 10/1983 | Beck et al. | |
| 4,423,312 A | 12/1983 | Wiedenfeld et al. | |
| 4,451,426 A | 5/1984 | Branchadell | |
| 4,476,084 A | 10/1984 | Takada | 264/342 R |

(Continued)

FOREIGN PATENT DOCUMENTS

| | | |
|---|---|---|
| DE | 10201850 | 8/2002 |
| EP | 202973 | 7/1989 |
| EP | 0237459 | 10/1989 |
| EP | 0442836 | 12/1994 |
| EP | 1147872 | 10/2001 |
| FR | 2595294 | 9/1987 |
| GB | 2074932 | 11/1981 |
| JP | 57201631 | 12/1982 |
| JP | 58173628 | 10/1983 |
| JP | 59201824 | 11/1984 |
| JP | 62284723 | 12/1987 |
| JP | 62284724 | 12/1987 |
| JP | 06015643 | 1/1994 |
| JP | 07132922 | 5/1995 |
| JP | 07132923 | 5/1995 |
| NZ | 232296 | 10/1992 |
| WO | 2004018182 | 3/2004 |

*Primary Examiner*—Michael C. Miggins
(74) *Attorney, Agent, or Firm*—Venable LLP

(57) ABSTRACT

A container, a container preform and a method of making the container or preform in which the finish of the preform or container is at least partially of crystallizable polymer construction, and has an end portion remote from the body of the preform or container, a capping flange adjacent to the body of the preform or container, and a mid portion between the end portion and the capping flange. The end portion of the finish forms an end surface, and the end and mid portions of the finish form continuous inner and outer surfaces. The polymer material in at least one of the end, inner and outer surfaces is crystallized, and crystallization in the finish in a direction perpendicular to such surface is graded from crystallization at the surface to an essential absence of crystallization at a position within the finish spaced from the surface.

23 Claims, 3 Drawing Sheets

U.S. PATENT DOCUMENTS

| | | |
|---|---|---|
| 4,589,559 A | 5/1986 | Hayashi .......................... 215/1 |
| 4,591,060 A * | 5/1986 | Tsukada et al. ............. 215/1 C |
| 4,609,516 A | 9/1986 | Krishnakumar ............. 264/255 |
| 4,618,515 A | 10/1986 | Collette et al. |
| 4,657,502 A | 4/1987 | Rydmann |
| 4,690,633 A | 9/1987 | Schad et al. |
| 4,729,372 A | 3/1988 | L'Esperance, Jr. |
| 4,744,937 A | 5/1988 | Settembrini |
| 4,826,971 A | 5/1989 | Skotnicki |
| 4,836,971 A | 6/1989 | Denis et al. |
| 4,846,656 A | 7/1989 | Denis et al. |
| 4,871,507 A | 10/1989 | Ajmera |
| 4,889,247 A | 12/1989 | Collette et al. |
| 4,891,178 A | 1/1990 | Ajmera et al. |
| 4,927,680 A | 5/1990 | Collette et al. |
| 4,928,835 A | 5/1990 | Collette ........................ 215/31 |
| 5,032,700 A | 7/1991 | Sugiyama et al. |
| 5,180,893 A | 1/1993 | Sugiyama et al. |
| 5,206,039 A | 4/1993 | Valyi |
| 5,229,042 A | 7/1993 | Denis et al. |
| 5,256,341 A | 10/1993 | Denis et al. |
| 5,261,545 A | 11/1993 | Ota ............................... 215/1 |
| 5,308,233 A | 5/1994 | Denis et al. |
| 5,342,558 A | 8/1994 | Denis et al. |
| 5,419,866 A | 5/1995 | Valyi |
| 5,520,877 A * | 5/1996 | Collette et al. ............. 262/521 |
| 5,641,451 A | 6/1997 | Orimoto et al. |
| 5,762,854 A | 6/1998 | Valyi |
| 5,762,982 A | 6/1998 | Knepper et al. |
| 5,780,069 A | 7/1998 | Suzuki |
| 6,080,353 A | 6/2000 | Tsuchiya |
| 6,099,766 A | 8/2000 | Aroki et al. |
| 6,139,812 A | 10/2000 | Potter et al. |
| 6,168,740 B1 | 1/2001 | Koch ........................ 264/237 |
| 6,217,959 B1 | 4/2001 | Slat |
| 6,309,313 B1 | 10/2001 | Peter |
| 6,315,967 B1 | 11/2001 | Potter et al. |
| 6,349,838 B1 | 2/2002 | Saito et al. |
| 6,413,600 B1 | 7/2002 | Slat |
| 2001/0016239 A1 | 8/2001 | Koch ........................ 428/35.7 |
| 2001/0028930 A1 | 10/2001 | Koch ........................ 428/35.7 |
| 2001/0054779 A1 | 12/2001 | Collette et al. |
| 2002/0160136 A1 | 10/2002 | Wong |

* cited by examiner

GRADED CRYSTALLIZATION OF CONTAINER FINISHES

The present invention is directed to containers of molded polymer construction, and more particularly to crystallization at the container neck finish.

BACKGROUND AND SUMMARY OF THE INVENTION

Containers of crystallizable polymer construction—e.g., PET construction—are conventionally fabricated in an injection blow molding operation, in which a preform is fabricated by injection molding, and the preform is then subjected to a blow molding operation to form the container. The container finish is formed to final geometry or substantially final geometry in the injection molding operation, and generally is of amorphous polymer construction. The body of the container is subjected to stretching during the blow molding operation so that the body is of oriented polymer construction. It has been proposed to strengthen and rigidify the finish portion of the container by crystallizing all or selected portions of the neck finish. See, for example, U.S. Pat. Nos. 4,618,515, 4,928,835 and 6,217,818. The uncrystallized portions of the container body and finish are typically translucent, while the crystallized portion(s) of the finish contain spherulite that has a milky opaque appearance.

The term "crystallizable polymer" in the present application refers to any polymer that is capable of being crystallized. These polymers include not only polyesters such as PET, which is the crystallizable polymer most typically used to make containers, but also polyolefins such as polyethylenes and polypropylenes, polycarbonates and polyamides such as nylons. Thus, although specific embodiments of the invention are disclosed in conjunction with polyesters—i.e., PET—the invention is by no means limited specifically to this polymer or family of polymers.

Likewise, when referring in the present application to preforms or containers that are at least partly of crystallizable polymer construction, or to preforms or containers of crystallizable polymer construction, such language refers not only to containers that are entirely of crystallizable polymer construction, but also to multilayer containers in which inside and outside layers are of crystallizable polymer construction. Other intermediate layers of the container or preform may include barrier materials against migration of gases through the container walls, layers of process regrind and/or layers that include post consumer resin. These intermediate layers may be included only in the body of the container, such that the container finish is of unlayered polymer construction, or may extend into the finish of the container. See, for example, U.S. Pat. Nos. 4,550,043, 4,609,516, 4,781,954, 4,990,301 and 5,098,274.

It has been proposed to crystallize the entire finish of a PET container to improve dimensional stability of the container finish. However, such complete crystallization may induce shrinkage of the finish as a result of crystallization, which is unacceptable in the threaded section of the finish to which a container closure will ultimately be secured. Conversely, a completely amorphous finish is subject to softening and movement as the container is hot-filled and capped because the temperature of the container may rise above the glass transition temperature of the plastic. It is therefore an object of the present invention to provide a technique for selectively crystallizing portions of the container finish that substantially reduces or eliminates shrinkage of the finish as a result of crystallization, provides desired stability in the finish sealing and thread area where the container closure will ultimately be secured, and/or that reduces consumption of energy as compared with crystallization of the entire finish area. Other and more specific objects of the invention are to provide a preform for blow molding a hollow plastic container, a hollow plastic container, and a method for forming a hollow plastic container in which the container finish is selectively crystallized as described above.

These and other objects are achieved in accordance with the present invention by selectively crystallizing the neck finish of the preform or container in such a way as to achieve substantial crystallization in at least a first portion of the finish, substantially no crystallization in a second portion of the finish, and graded crystallization between the first and second portions of the finish. The term "graded crystallization" refers to a gradual transition between substantial crystallization and substantially no crystallization, as distinguished from a sharp or distinct non-graded pattern of contrast between crystallized and uncrystallized portions of the neck finish. The gradation of crystallization is continuous, and may be either linear or non-linear with distance.

The present invention embodies a number of aspects, that may be implemented separately from or in combination with each other.

In accordance with a first aspect of the invention, a preform for blow molding a hollow plastic container, which is at least partly of crystallizable polymer construction, includes a finish and a body integral with the finish. The finish has an end portion remote from the body, a capping flange adjacent to the body, and a mid portion between the end portion and the capping flange. The end and mid portions form a continuous outer surface and a continuous inner surface, with one of the inner and outer surfaces being crystallized throughout its length and the other of the inner and outer surfaces including at least a portion that is essentially uncrystallized. Crystallization in at least the mid portion of the finish is graded between the crystallized surface and the uncrystallized portion of the other surface. In accordance with another aspect of the present invention, the end and mid portions form a continuous outer surface that is crystallized throughout its length, and a continuous inner surface at least a portion of which is essentially uncrystallized. Crystallization in at least a mid portion of the finish is graded between the outer and inner surfaces, and between the mid portion of the finish and the capping flange. In accordance with a third aspect of the invention, at least the end portion of the finish is crystallized, and crystallization in the finish is graded from full crystallization at the end portion.

In accordance with yet another aspect of the present invention, a hollow plastic container of crystallizable polymer construction includes a finish and an integral body. The finish has an end portion remote from the body, a capping flange adjacent to the body, and a mid portion extending between the end portion and the capping flange. The end and mid portions form continuous outer and inner surfaces, with one of the outer and inner surfaces being crystallized throughout its length and the other of the inner and outer surfaces including at least a portion that is essentially uncrystallized. Crystallization in at least the mid portion of the finish is graded between the crystallized surface and the uncrystallized portion of the other surface. In accordance with another aspect of the invention, the end and mid portions of the container finish form a continuous outer surface that is crystallized throughout its length, and a continuous inner surface at least a portion of which is essentially uncrystallized. Crystallization in at least the mid portion of the container finish is graded between the outer and inner surfaces and between the mid portion and the capping flange. In accordance with a further object of the invention, at least the end portion of the finish is crystallized, and crystallization in the finish is graded from full crystallization at the end portion of the finish.

Yet another aspect of the present invention provides a method of making a hollow plastic container, which includes molding a preform of crystallizable polymer construction and blow molding the preform to form the hollow plastic container. Either prior to or subsequent to blow molding the preform, the finish is crystallized at one of the inner and outer surfaces of the finish in such a way that one surface is crystallized throughout its length and the other surface includes at least a portion that is essentially uncrystallized, with crystallization in at least the mid portion of the finish being graded between the surfaces. In accordance with a further aspect of the invention, crystallization of the finish of either the preform or the container is such that the outer surface of the finish is crystallized throughout its length and at least a portion of the inner surface is essentially uncrystallized. Crystallization in at least the mid portion of the finish is graded between the outer and inner surfaces and between the mid portion and the capping flange. In accordance with yet another aspect of the invention, crystallization at the finish is such that at least the end portion of the finish is crystallized, and crystallization in the finish is graded from crystallization at the end portion.

BRIEF DESCRIPTION OF THE DRAWINGS

The invention, together with additional objects, features and advantages thereof, will be best understood from the following description, the appended claims and the accompanying drawings in which:

DETAILED DESCRIPTION OF PREFERRED EMBODIMENTS

Figures 1, 2:
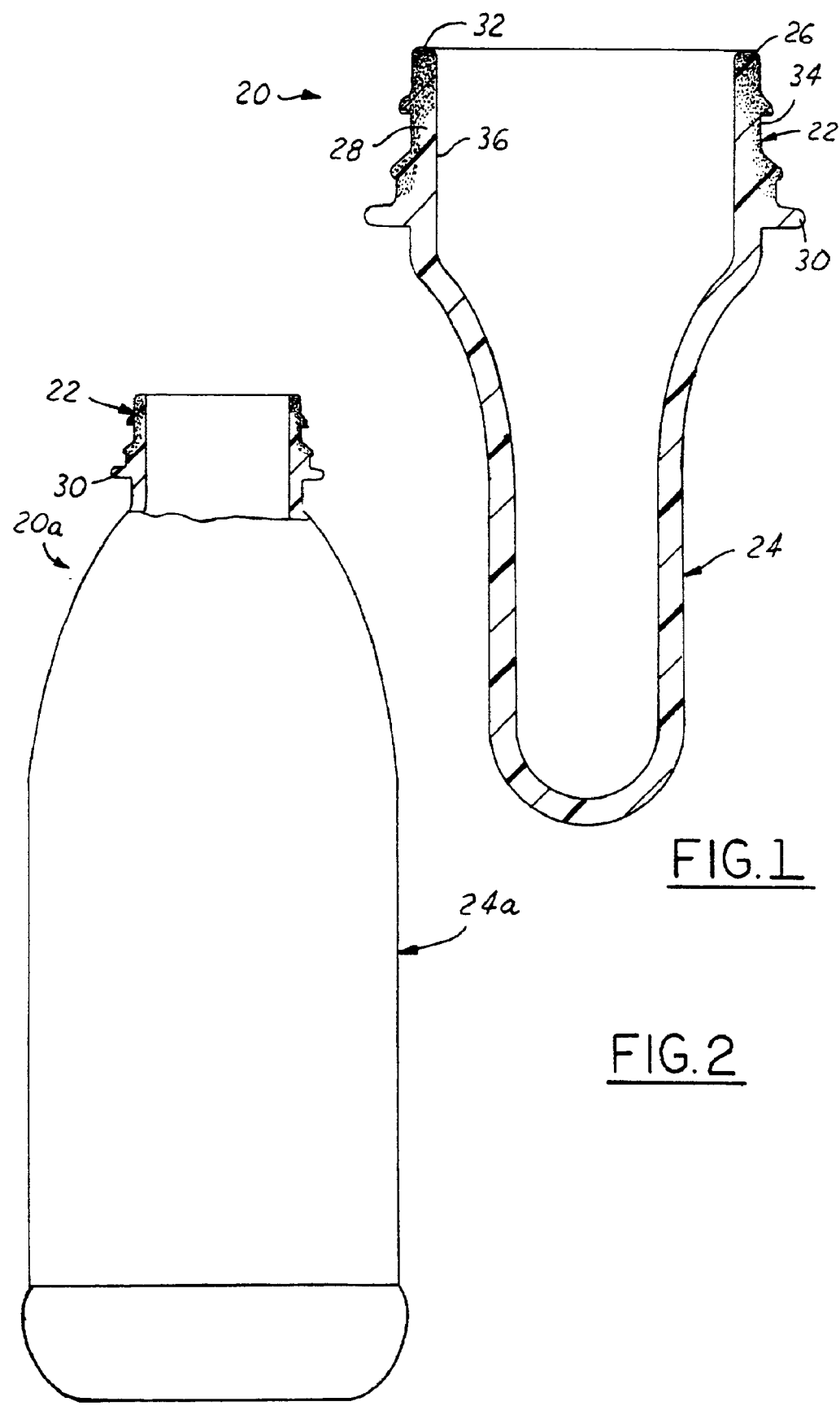
FIG. 1 is a cross sectional view of a preform for blow molding a container in accordance with one aspect of the present invention.
FIG. 2 is a partially sectioned view of a container blow molded from the preform illustrated in FIG. 1.
Figure 3:
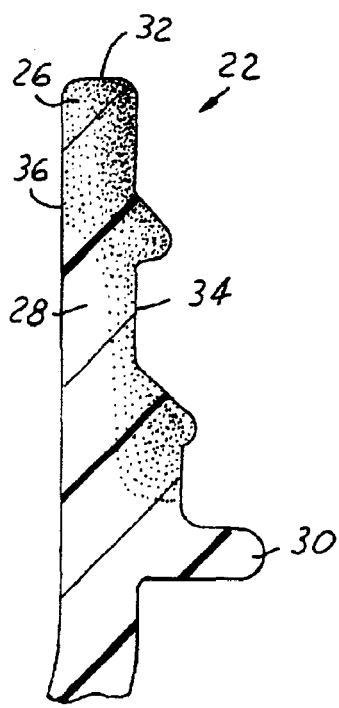
FIG. 3 is an enlarged fragmentary sectional view of the neck finish in the preform of FIG. 1.

FIGS. 1 and 3 illustrate a preform 20 in accordance with one aspect of the present invention as comprising a finish 22 and a body 24. Finish 22 and body 24 are integrally formed in an injection molding operation, for example, and are either of monolayer or multilayer construction as previously described. Patents noted above illustrate various automated techniques for fabricating preforms 20. Finish 22 of preform 20 includes an end portion 26 remote from body 24, a mid portion 28, and a capping ring or flange 30 adjacent to body 24 that generally separates finish 22 from body 24. End portion 26 defines an end surface 32. End portion 26 and mid portion 28 also define a continuous external surface 34 that includes at least one external thread for ultimate securement of a container closure, and an internal surface 36 that will form the mouth of the container. FIG. 2 illustrates a container 20a blow molded from preform 20. Container 20a includes finish 22 and a body 24a that is blow molded from preform body 24. The exemplary finish of FIGS. 1–3 (as well as the finishes of FIGS. 4–9) also have an external thread for later securement of a closure, and a retaining bead for cooperating with tamper-indicating structure on the closure.

Referring in particular to FIG. 3, and in accordance with one presently preferred embodiment of the invention, preform finish 22 (and therefore ultimately container finish 22) is selectively crystallized for enhanced dimensional stability of the thread and sealing surface areas of the finish. Crystallization in FIG. 3 (and in FIGS. 4–11) is illustrated by shading or stippling, with the density of the shading or stippling indicating the degree of crystallization, and with the absence of shading or stippling indicating an absence of substantial crystallization. Reference to an absence of crystallization, or to the fact that a portion of the finish is essentially uncrystallized or amorphous, means that there is an absence of intended crystallization, and that any crystallization is an unintended and insubstantial minor result of variations in the manufacturing process. The degree of crystallization will depend upon the intended application. In other words, the darkest areas of the drawings may possess 50% crystallization, decreasing to substantially zero crystallization through the graded area.

In FIG. 3, there is substantial crystallization at the outside edge of upper portion 26 of finish 22, and graded crystallization from the upper outside edge of upper portion 26 both radially inwardly and axially downwardly with respect to finish 22. (Directional words such as "axial" and "radial" are employed by way of description and not limitation with respect to the central axis of the container finish. Directional words such as "upper" and "downward" are employed by way of description and not limitation with respect to the upright orientations of the preforms and containers illustrated in the drawings.) In mid portion 28 of finish 22 in FIG. 3, there is some crystallization along outside surface 34, but an absence of crystallization along at least the lower portion of inside surface 36. Capping flange 30 is essentially free of crystallization in this embodiment. Thus, in the embodiment of FIG. 3. There is heavy crystallization along outer surface 34 in upper finish portion 26 and the upper part of mid portion 28, graded crystallization radially inwardly to surface 36, where there is partial crystallization in upper portion 26 and the upper part of mid portion 28, and axially graded crystallization along surface 34 in the middle and lower sections of mid finish portion 28. In these mid and lower sections of mid portion 28 crystallization is graded radially inwardly to about the center of the finish thickness, and no crystallization at inner surface 36. (It will be understood that crystallization around the circumference of finish 22 is the same as illustrated in the cross section of FIG. 3 (as well as the cross sections of FIGS. 4–8) within manufacturing tolerance variations.)

Figure 4:
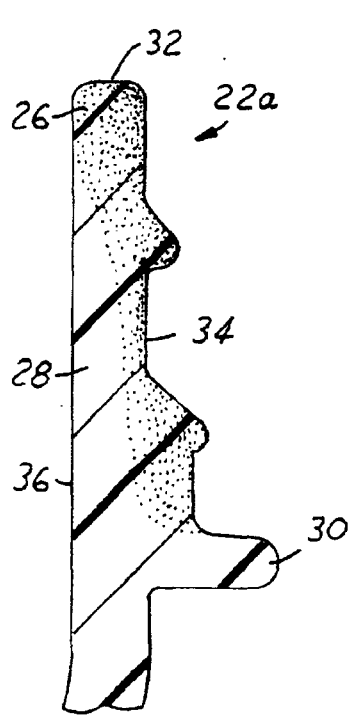
FIGS. 4–11 are fragmentary sectional views similar to that of FIG. 3 but illustrating respective additional embodiments of the invention.
Figure 5:
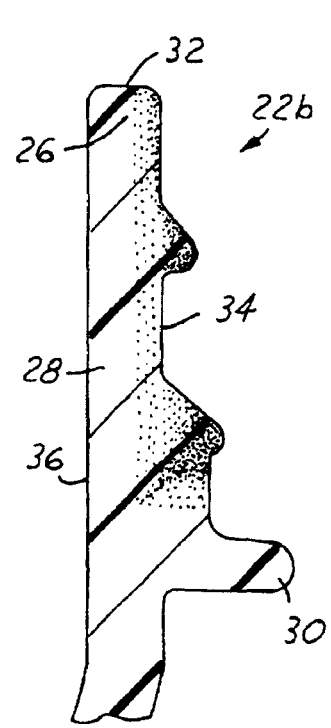
Figure 6:
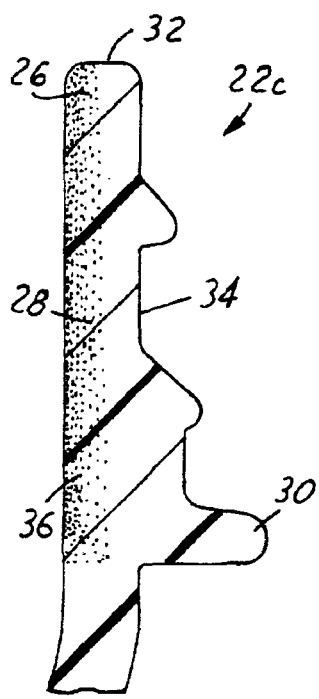

FIG. 4 illustrates a finish 22a, in which crystallization is similar to that in FIG. 3. The uncrystallized inner area of mid portion 28 extends upwardly into end portion 26, while the partially crystallized lower end of mid portion 28 extends to a position adjacent to capping flange 30. Again, capping flange 30 is essentially free of crystallization. FIG. 5 illustrates a finish 22b, in which there is full crystallization along outer surface 34 from end portion 26 through mid portion 28, with capping flange 30 being essentially free of crystallization. Crystallization is graded from substantial crystallization at outer surface 34 to no crystallization at and near inner surface 36. Crystallization is also graded in the axial direction from substantial crystallization in mid portion 34 to essentially no crystallization at capping flange 30. FIG. 6 illustrates a finish 22c that has full crystallization at inner surface 36 in both end portion 26 and mid portion 28. Crystallization is graded in the radial direction from substantial crystallization at inner surface 36 to absence of crystallization at and adjacent to outer surface 34. Crystallization is also graded in the axial direction, with there being partial crystallization at inner surface 36 radially inwardly of capping flange 30.

Controlled crystallization in the embodiments of FIGS. 3–6 (and FIGS. 7–8) can be obtained in any suitable manner, including for example directing heat from a quartz lamp onto the area to be crystallized while cooling the opposing area of the finish that is to remain uncrystallized. For example, in the embodiment of FIG. 3, hot air can be directed against the outside surface and the upper portion of the inside surface of the finish, while a chill plug or the like is employed to chill the lower portion of the inside surface. Heat shields can also be employed to prevent crystallization, as illustrated for example in above-noted U.S. Pat. No. 4,928,835. Likewise, in the embodiment of FIG. 6, hot air can be directed onto the inside surface of the preform finish, while the interior of the preform body and the outside surface of the preform body are suitably shielded and/or cooled to prevent crystallization.

Figure 7:
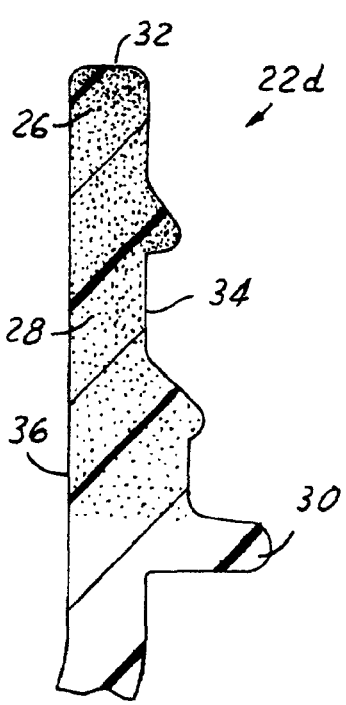
Figure 8:
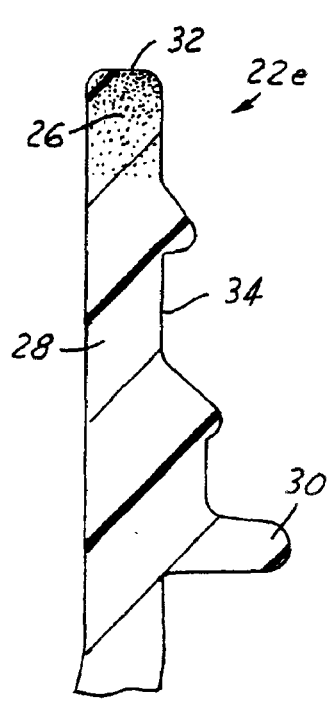

FIG. 7 illustrates a preform finish 22d in accordance with a modified embodiment of the invention, in which upper portion 26 of the finish is crystallized at and beneath end surface 32, while graded crystallization extends through mid portion 28 to a position at or slightly into capping flange 30. FIG. 8 illustrates a finish 22e in which end portion 26 is crystallized at surface 32, and crystallization is axially graded from surface 32 to a substantial absence of crystallization in mid portion 28. The embodiments of FIGS. 7 and 8 are particularly useful for stabilizing only the sealing portion at the end of the container finish.

Figure 9:
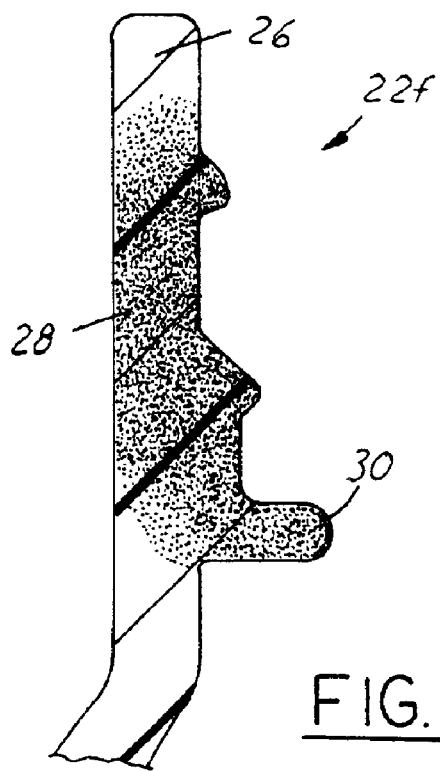

FIG. 9 illustrates a preform (or container) finish 22f in which end portion 26 is essentially uncrystallized, while mid portion 28 and capping flange 30 are crystallized. Crystallization is graded axially between mid portion 28 and end portion 26, and is graded radially inwardly and axially downwardly from mid portion 28 radially inwardly of capping flange 30.

Figure 10:
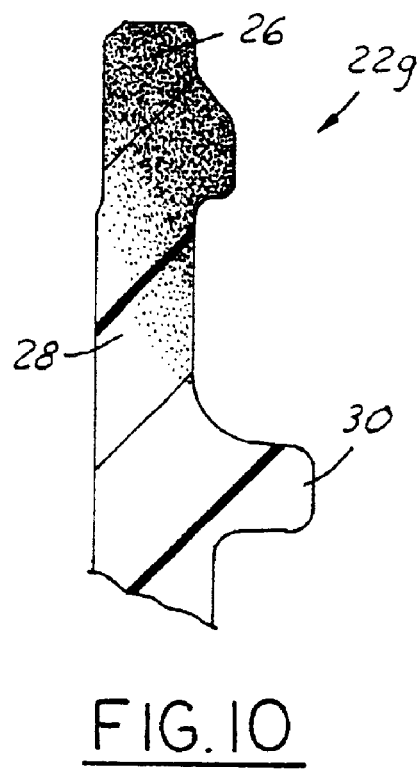

FIG. 10 illustrates a finish 22g having an external snap bead rather than a external thread for securing a closure. End portion 26 is crystallized throughout its thickness, and the upper part of mid portion 28 is crystallized at the outer surface where the closure-attachment bead is disposed. Crystallization is graded radially inwardly and axially downwardly from the upper part of mid portion 28, and capping flange 30 is essentially uncrystallized.

Figure 11:
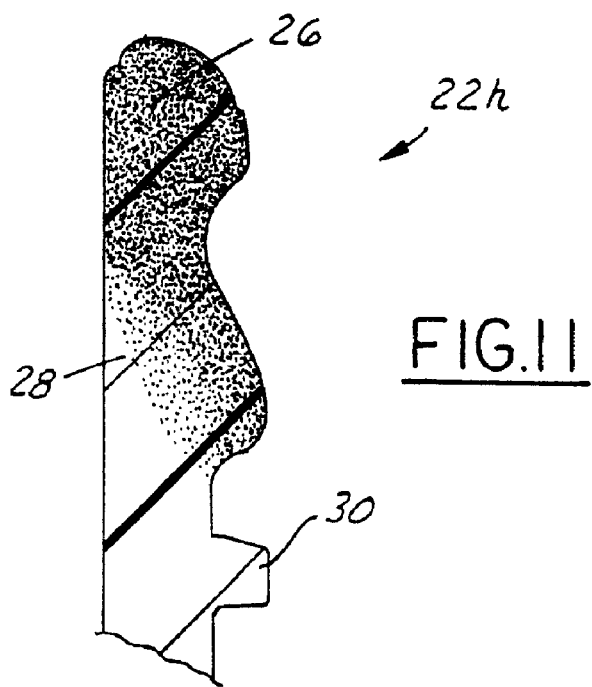

FIG. 11 illustrates implementation of the invention in a crown type finish 22h often used on beer bottles, for example. Upper finish portion 26, including the finish crown, is substantially crystallized throughout its thickness. The upper and outer surface portions of mid portion 28 are crystallized, while the radially inner part of mid portion 28 is graded axially downwardly and radially inwardly. Flange 30 is essentially uncrystallized.

Although the preferred embodiments of the invention have been discussed in conjunction with crystallizing the finish of the preform, which is preferred for process handling purposes, it will be understood that the crystallization operation could take place in the neck finish after the container is blown to final form. Such a modification would be particularly useful in situations in which the finish geometry is modified during the blow molding operation. Thus, crystallization in accordance with the present invention can be implemented on either amorphous or oriented finishes.

There has thus been described preforms, containers and methods of manufacture that fully implement all of the objects and aims previously set forth. The invention has been disclosed in conjunction with a number of presently preferred embodiments, and several additional modifications and variations have been discussed. Other modifications and variations will readily suggest themselves to persons of ordinary skill in the art. The invention is intended to embrace all such modifications and variations as fall within the spirit and broad scope of the appended claims.

What is claimed is:

1. A preform for blow molding a hollow plastic container, said preform being at least partially of crystallizable polymer construction and including:
   a neck finish and a body integral with said neck finish,
   said neck finish having an end portion remote from said body, a capping flange adjacent to said body, and a mid portion between said end portion and said capping flange,
   said end and mid portions forming a continuous outer surface and a continuous inner surface,
   one of said inner and outer surfaces being crystallized throughout its length and the other of said inner and outer surfaces including at least a portion that is essentially uncrystallized,
   crystallization in at least said mid portion of said neck finish being graded between said crystallized surface and the uncrystallized portion of the other surface,
   said body and said neck finish below said capping flange being essentially free of crystallization.

2. The preform set forth in claim 1 wherein said outer surface is crystallized throughout its length and at least a portion of said inner surface is crystallized.

3. The preform set forth in claim 2 wherein said end portion of said neck finish is crystallized throughout its thickness between said inner and outer surfaces.

4. The preform set forth in claim 2 wherein crystallization in said end portion of said neck finish is graded between said outer and inner surfaces, being crystallized at said outer surface and uncrystallized at said inner surface.

5. The preform set forth in claim 1 wherein said inner surface is crystallized throughout its length and said outer surface is essentially uncrystallized.

6. The preform set forth in claim 1 wherein said capping flange is essentially uncrystallized.

7. A preform for blow molding a hollow plastic container, said preform being at least partially of crystallizable polymer construction and including:
   a neck finish and a body integral with said neck finish,
   said neck finish having an end portion remote from said body, a capping flange adjacent to said body, and a mid portion between said end portion and said capping flange,
   said end and mid portions forming a continuous outer surface that is crystallized throughout its length, and a continuous inner surface at least a portion of which is essentially uncrystallized,
   crystallization in at least said mid portion of said neck finish being graded between said outer and inner surfaces and between said mid portion and said capping flange,
   said body and said neck finish below said capping flange being essentially free of crystallization.

8. The preform set forth in claim 7 wherein said end portion of said neck finish is crystallized throughout its thickness between said inner and outer surfaces.

9. The preform set forth in claim 7 wherein crystallization in said end portion of said neck finish is graded between said outer and inner surfaces, being crystallized at said outer surface and essentially uncrystallized at said inner surface.

10. The preform set forth in claim 7 wherein said capping flange is essentially uncrystallized.

11. A preform for blow molding a hollow plastic container, said preform being at least partially of crystallizable polymer construction and including:
   a neck finish and a body integral with said neck finish,
   said neck finish having an end portion remote from said body, a capping flange adjacent to said body and a mid portion between said end portion and said capping flange,
   at least said end portion of said neck finish being crystallized, and crystallization in said neck finish being graded axially of said neck finish from crystallization at said end portion,
   said body being essentially free of crystallization.

12. A preform for blow molding a hollow plastic container, said preform being at least partially of crystallizable polymer construction and including:
   a neck finish and a body integral with said neck finish,
   said neck finish having a first end portion remote from said body, a second end portion adjacent to said body, and a mid portion between said first and second end portions,
   said first end and mid portions forming a continuous outer surface and a continuous inner surface,
   said outer surface being crystallized throughout its length and said inner surface including at least a portion that is essentially uncrystallized,
   crystallization in at least said mid portion of said neck finish being graded between said crystallized outer surface and the uncrystallized portion of said inner surface, said body being essentially free of crystallization.

13. The preform set forth in claim 12 wherein said first end portion of said neck finish is crystallized throughout its thickness between said inner and outer surfaces.

14. The preform set forth in claim 12 wherein crystallization in said first end portion of said neck finish is graded between said outer and inner surfaces, being crystallized at said outer surface and uncrystallized at said inner surface.

15. A preform for blow molding a hollow plastic container, said preform being at least partially of crystallizable polymer construction and including:
   a neck finish and a body integral with said neck finish,
   said neck finish having a first end portion remote from said body, a second end portion adjacent to said body, and a mid portion between said first and second end portions,
   said first end and mid portions forming a continuous outer surface that is crystallized throughout its length, and a continuous inner surface at least a portion of which is essentially uncrystallized,
   crystallization in at least said mid portion of said neck finish being graded between said outer and inner surfaces and between said mid portion and said second end portion, and said body being essentially free of crystallization.

16. The preform set forth in claim 15 wherein said first end portion of said neck finish is crystallized throughout its thickness between said inner and outer surfaces.

17. The preform set forth in claim 15 wherein crystallization in said first end portion of said neck finish is graded between said outer and inner surfaces, being crystallized at said outer surface and essentially uncrystallized at said inner surface.

18. A preform for blow molding a hollow plastic container, said preform being at least partially of crystallizable polymer construction and including:
   a neck finish and a body integral with said neck finish,
   said neck finish having a first end portion remote from said body, a second end portion adjacent to said body and a mid portion between said first and second end portions,
   at least said first end portion of said neck finish being crystallized, and crystallization in said neck finish being axially graded from crystallization at said first end portion,
   said body being essentially free of crystallization.

19. The preform set forth in claim 18 wherein crystallization in said first end portion of said neck finish is graded between said outer and inner surfaces, being crystallized at said outer surface and essentially uncrystallized at said inner surface.

20. The preform set forth in claim 18 wherein said first end portion of said neck finish is crystallized throughout its thickness between said inner and outer surfaces.

21. The preform set forth in claim 20 wherein graded crystallization in said neck finish extends into said mid portion of said neck finish.

22. The preform set forth in claim 18 wherein said first end and mid portions of said neck finish form a continuous outer surface and a continuous inner surface, one of said inner and outer surfaces being crystallized throughout its length and the other of said inner and outer surfaces including at least a portion that is essentially uncrystallized.

23. The preform set forth in claim 15 wherein crystallization in at least said mid portion of said neck finish is graded between said surfaces.

* * * * *